United States Patent
Yukimasa et al.

(10) Patent No.: US 9,478,813 B2
(45) Date of Patent: *Oct. 25, 2016

(54) POWER GENERATION SYSTEM AND METHOD OF OPERATING THE SAME

(75) Inventors: Akinori Yukimasa, Osaka (JP); Junji Morita, Kyoto (JP); Shigeki Yasuda, Osaka (JP); Atsutaka Inoue, Kyoto (JP); Hiroshi Tatsui, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 613 days.

This patent is subject to a terminal disclaimer.

(21) Appl. No.: 13/993,626

(22) PCT Filed: Dec. 13, 2011

(86) PCT No.: PCT/JP2011/006958
§ 371 (c)(1),
(2), (4) Date: Jun. 12, 2013

(87) PCT Pub. No.: WO2012/081236
PCT Pub. Date: Jun. 21, 2012

(65) Prior Publication Data
US 2013/0266881 A1 Oct. 10, 2013

(30) Foreign Application Priority Data
Dec. 13, 2010 (JP) ................. 2010-276898

(51) Int. Cl.
*H01M 8/04* (2016.01)
*H01M 8/24* (2016.01)
(Continued)

(52) U.S. Cl.
CPC ........ *H01M 8/04014* (2013.01); *F23L 17/005* (2013.01); *F23N 3/082* (2013.01);
(Continued)

(58) Field of Classification Search
None
See application file for complete search history.

(56) References Cited

U.S. PATENT DOCUMENTS

| 4,187,833 A | 2/1980 | Zahora et al. |
| 5,697,210 A | 12/1997 | Kawauchi |

(Continued)

FOREIGN PATENT DOCUMENTS

| DE | 10000406 | * 7/2000 |
| JP | 59-219625 A | 12/1984 |

(Continued)

OTHER PUBLICATIONS

Chinese Notification of First Office Action issued in corresponding Chinese Patent Application No. 201180059684.7, mailed on Jun. 3, 2015; 11 pages with English translation.

(Continued)

*Primary Examiner* — Jonathan Crepeau
(74) *Attorney, Agent, or Firm* — McDermott Will & Emery LLP (57) ABSTRACT

A power generation system has a power generation unit (1), a casing (2) accommodating the power generation unit (1), a ventilator (3) configured to ventilate the interior of the casing (2), and a first exhaust gas passage (4) configured to pass therethrough an exhaust gas from the ventilator (3) which is discharged out of the casing (2). The first exhaust gas passage (4) merges with a second exhaust gas passage (6) connected to a duct (11) open to outside air before the second exhaust gas passage (6) is connected to the duct (11), the second exhaust gas passage (6) being configured to pass a combustion exhaust gas from a combustion device (5) configured to generate heat to be supplied to a heat load.

18 Claims, 2 Drawing Sheets

(51) Int. Cl.
*F23L 17/00* (2006.01)
*F23N 3/08* (2006.01)
*F23N 5/24* (2006.01)

(52) U.S. Cl.
CPC ........ *F23N 5/242* (2013.01); *H01M 8/04022* (2013.01); *H01M 8/04776* (2013.01); *F23J 2211/20* (2013.01); *F23N 2027/02* (2013.01); *F23N 2033/04* (2013.01); *H01M 8/2475* (2013.01); *H01M 2250/10* (2013.01); *H01M 2250/405* (2013.01); *Y02B 90/14* (2013.01); *Y02B 90/16* (2013.01); *Y02E 60/50* (2013.01)

(56) References Cited

U.S. PATENT DOCUMENTS

| | | |
|---|---|---|
| 6,000,391 A | 12/1999 | Timmons |
| 2002/0127446 A1 | 9/2002 | Ueda et al. |
| 2007/0269696 A1 | 11/2007 | Skok et al. |
| 2008/0118795 A1 | 5/2008 | Yoshikata et al. |
| 2012/0151920 A1 | 6/2012 | Skok et al. |

FOREIGN PATENT DOCUMENTS

| | | |
|---|---|---|
| JP | 8-74519 A | 3/1996 |
| JP | 08-293316 | 11/1996 |
| JP | 09-223510 A | 8/1997 |
| JP | 2004-176976 A | 6/2004 |
| JP | 2005-063697 A | 3/2005 |
| JP | 2006-253020 A | 9/2006 |
| JP | 2007-248009 A | 9/2007 |
| JP | 2008-210631 A | 9/2008 |
| JP | 2009-245768 | 10/2009 |
| JP | 2010-262746 A | 11/2010 |
| JP | 2010-269954 A | 12/2010 |

OTHER PUBLICATIONS

International Search Report issued in PCT/JP2011/006958, mailed Mar. 6, 2013.

* cited by examiner

POWER GENERATION SYSTEM AND METHOD OF OPERATING THE SAME

RELATED APPLICATIONS

This application is the U.S. National Phase under 35 U.S.C. §371 of International Application No. PCT/JP2011/006958, filed on Dec. 13, 2011, which in turn claims the benefit of Japanese Application No. 2010-276898, filed on Dec. 13, 2010, the disclosures of which Applications are incorporated by reference herein.

TECHNICAL FIELD

The present invention relates to a power generation system used with a combustion device in a cogeneration system and also relates to a method of operating the same.

BACKGROUND ART

Generally, a cogeneration system is such a system that covers the power load by supplying generated electric power to the customer and also covers the hot water supply load of the customer by recovering the waste heat associated with the electric power generation and storing the heat. A fuel cell system in which a fuel cell and a hot water supply device are operated using the same fuel is known as one example of such a cogeneration system (see, for example, Patent Literature 1). This fuel cell system has a fuel cell, a heat exchanger for recovering the heat generated in association with the operation of the fuel cell, a hot water tank for storing the water having been heated by circulating through the heat exchanger, and a hot water supply device having the function to warm up the water that flows out of the hot water tank. This fuel cell system is configured so that the fuel cell and the hot water supply device are operated with the same fuel.

Also known is a power generating device having a duct extending in a vertical direction for the purpose of improving the discharge performance of the exhaust gas produced by a fuel cell disposed inside a building (see, for example, Patent Literature 2). In this power generating device, the duct the upper end of which is located inside the building is a double pipe, and a ventilation pipe and an exhaust pipe are connected separately to the duct so that the exhaust gas and the air can individually pass through the inner portion and the outer portion of the duct.

CITATION LIST

Patent Literature

Patent Literature 1: Japanese Unexamined Patent Publication No. 2007-248009
Patent Literature 2: Japanese Unexamined Patent Publication No. 2008-210631

SUMMARY OF INVENTION

Technical Problem

The power generating device disclosed in Patent Literature 2 is configured so that an exhaust gas passage of a ventilation fan and an exhaust gas passage of a fuel cell are connected individually to the duct. However, no consideration is made on appropriate configurations in which a combustion exhaust gas passage, which passes the combustion exhaust gas from a combustion device as in Patent Literature 1 for generating the heat that is to be supplied to a heat load, is connected with the duct.

The present invention has been accomplished to solve such a problem, and it is an object of the invention to provide a power generation system having an appropriate configuration in which a combustion exhaust gas passage for passing a combustion exhaust gas from a combustion device that supplies heat to a heat load is connected with a duct, and to provide a method of operating the power generation system.

Solution to Problem

If incomplete combustion occurs in the combustion device in the configuration of connecting the combustion exhaust gas from the combustion device with the duct, there is a possibility that the combustion exhaust gas inside the combustion exhaust gas passage to the duct may contain a combustible gas. It is undesirable that gas leakage occurs when the combustion exhaust gas contains a combustible gas. In view of that, the present inventors have focused attention to the point that the combustible gas can be diluted by merging the exhaust gas from the ventilator with the combustion exhaust gas passage before it flows into the duct.

In order to solve the foregoing problems, a power generation system according to one aspect of the present invention comprises: a power generation unit; a casing accommodating the power generation unit; a ventilator configured to ventilate the interior of the casing; and a first exhaust gas passage configured to pass an exhaust gas from the ventilator which is discharged out of the casing, wherein the first exhaust gas passage merges with a second exhaust gas connected to a duct open to outside air before the second exhaust gas passage is connected to the duct, the second exhaust gas passage being configured to pass a combustion exhaust gas from a combustion device configured to generate heat to be supplied to a heat load.

Advantageous Effects of Invention

The present invention offers higher safety at the time when leakage occurs in the second exhaust gas passage than the case in which the first exhaust gas passage and the second exhaust gas passage are connected individually to the duct.

The foregoing and other objects, features and advantages of the present invention will become more readily apparent from the following description of embodiments of the invention, with reference to the accompanying drawings.

DESCRIPTION OF EMBODIMENTS

Hereinbelow, embodiments of the invention are described in detail with reference to the drawings.

Embodiment 1

A power generation system according to Embodiment 1 comprises: a power generation unit; a casing accommodating the power generation unit; a ventilator configured to ventilate the interior of the casing; and a first exhaust gas passage configured to pass an exhaust gas from the ventilator which is discharged out of the casing, wherein the first exhaust gas passage merges with a second exhaust gas connected to a duct open to outside air before the second exhaust gas passage is connected to the duct, the second exhaust gas passage being configured to pass a combustion exhaust gas from a combustion device configured to generate heat to be supplied to a heat load. Herein, the phrase the second exhaust gas passage "connected" to the duct is meant to include an embodiment in which the downstream end of the second exhaust gas passage is open to the duct and an embodiment in which the second exhaust gas passage is introduced inside the duct, extends in the duct, and extends outside from an opening of the duct to outside air.

With such a configuration, the combustion exhaust gas from the combustion device is mixed with the atmosphere gas inside the casing from the ventilator. This makes it possible to dilute a combustible gas contained in the combustion exhaust gas even if the combustible gas is contained in the combustion exhaust gas inside the second exhaust gas passage. This offers higher safety at the time when leakage occurs in the second exhaust gas passage than the case in which the first exhaust gas passage and the second exhaust gas passage are connected individually to the duct.

The power generation system may further comprise a controller configured to allow the ventilator to operate when the combustion device is performing a combustion operation.

Such a configuration makes it possible to dilute the combustible gas contained in the combustion exhaust gas even if the combustible gas is contained in the combustion exhaust gas during the time in which the combustion exhaust gas is being discharged from the combustion device.

Here, the operation of the ventilator may be either a continuous operation or an intermittent operation. The reason is that both the continuous operation and the intermittent operation are capable of diluting the combustible gas in the combustion exhaust gas if the combustible gas is contained in the combustion exhaust gas. In other words, both the continuous operation and the intermittent operation are capable of offering higher safety than in the case in which the first exhaust gas passage and the second exhaust gas passage are connected individually to the duct.

It should be noted that although the power generation system described hereinbelow employs an embodiment in which the ventilator is allowed to operate when the power generation unit is in a power generation operation, the invention is not limited thereto. The reason is that even when the ventilator is operated arbitrarily irrespective of whether or not the power generation unit is in the power generation operation, it is highly likely that there will be a time period in which the ventilator is operated during the combustion operation of the combustion device.

[Configuration]

Figure 1:
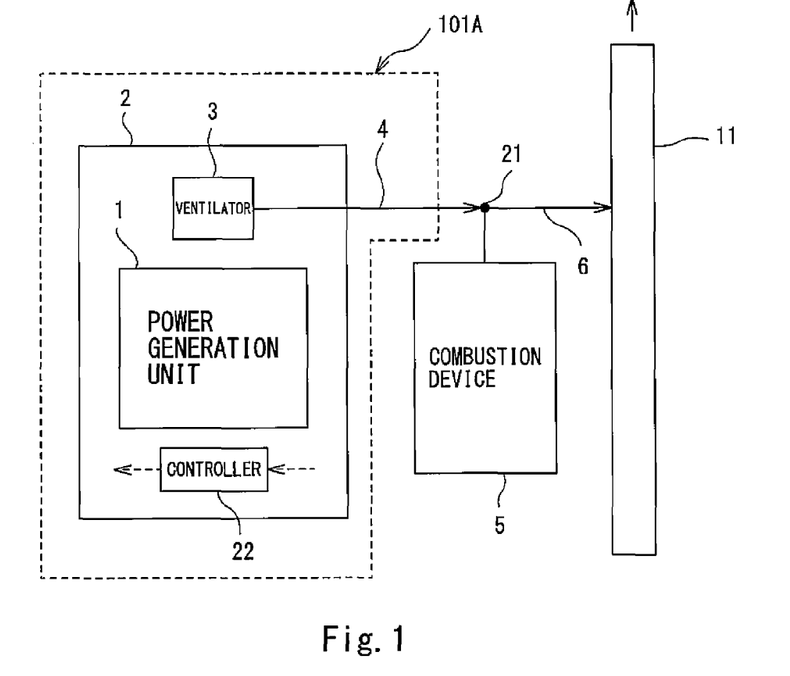
FIG. 1 is a block diagram schematically illustrating the configuration of a power generation system according to Embodiment 1.

FIG. 1 is a block diagram schematically illustrating the configuration of a power generation system according to Embodiment 1.

As illustrated in FIG. 1, a power generation system 101A is used along with a combustion device 5 and a second exhaust gas passage 6.

The power generation system 101A comprises a power generation unit 1, a casing 2 accommodating the power generation unit 1, a ventilator 3 configured to ventilate the interior of the casing 2, and a first exhaust gas passage 4 configured to pass an exhaust gas from the ventilator 3 which is discharged out of the casing 2. The second exhaust gas passage 6, which is configured to pass the combustion exhaust gas from the combustion device 5, is connected to a duct 11 one end of which is open to outside air. The first exhaust gas passage 4 merges with the second exhaust gas passage 6 before the second exhaust gas passage 6 is connected to the duct 11.

The power generation unit 1 is a power generation unit that generates electric power using fuel, examples of which include a fuel cell and a gas engine generator. In a power generating operation of the power generation unit 1, a combustor, not shown in the drawings, combusts the fuel and discharges a combustion exhaust gas. The combustion exhaust gas is discharged out of the casing 2, and it may be passed through any kind of discharge path.

The ventilator 3 may be any type of ventilator as long as it can ventilate the interior of the casing 2, and it may be installed at any location of the casing 2. The configuration for drawing a gas for ventilation into the casing 2 by the ventilator 3 is not particularly limited. For example, in the space in which the casing 2 is installed, the gas for ventilation may be drawn into the casing 2 from an air intake port provided in the casing 2. Alternatively, the first exhaust gas passage 4 and a gas passage for intake may be composed of a double pipe, and the gas for ventilation may be taken into the casing 2 through one of the pipe passages (for example, the outer one of the pipe passages) of the double pipe. In this case, the second exhaust gas passage 6 may also be composed of a double pipe so that the combustion air for the combustion device may be passed through the same one of the pipe passages as that in the first exhaust gas passage 4. The ventilator 3 is composed of a fan, for example.

The first exhaust gas passage 4 is provided so as to guide the gas within the casing 2 from the ventilator 3 to the second exhaust gas passage 6. The first exhaust gas passage 4 merges with the second exhaust gas passage 6. It is preferable that the first exhaust gas passage 4 be provided with a backflow prevention mechanism (not shown: a check valve or the like) for preventing the backflow of the gas from the second exhaust gas passage 6.

The combustion device 5 is a device for generating heat to be supplied to a heat load (not shown) by combusting a fuel gas. An example of the combustion device 5 is a hot water supply device (e.g., a boiler). The combustion device 5 generates the combustion exhaust gas by combusting a fuel gas in its operation. Hereinafter, "the combustion exhaust gas from the combustion device 5" is sometimes referred to as simply "the combustion exhaust gas". If an incomplete combustion occurs in the combustion device 5, it is possible that the combustion exhaust gas may contain a combustible gas. Examples of the heat load (not shown) include house heaters, baths, and showers.

The second exhaust gas passage 6 is provided so as to discharge the combustion exhaust gas from the combustion device 5 to outside. The second exhaust gas passage 6 may be in any form as long as the combustion exhaust gas can be discharged from the combustion device 5 to outside. It is preferable that the second exhaust gas passage 6 be provided with a backflow prevention mechanism (not shown: a check valve or the like) for preventing the backflow of the gas from the first exhaust gas passage 4.

The power generation system 101A further has a controller 22. The controller 22 is configured to allow the ventilator 3 to operate when the combustion device 5 is performing a combustion operation. More specifically, the controller 22 controls the operation of the ventilator 3. A predetermined time x (sec.), which will be described later, is set in the controller 22. The controller 22 may be any type of controller as long as it has a control function, and it has an arithmetic processing unit and a storage unit for storing control programs. Examples of the controller 22 include a microcontroller and a PLC (Programmable Logic Controller). Examples of the arithmetic processing unit include an MPU and a CPU. An example of the storage unit is a memory. The controller 22 may be composed of either a single controller that performs centralized control or a plurality of controllers that perform distributed control in cooperation with each other. The controller 22 may be installed at any location. For example, it may be accommodated in the casing 2 as illustrated in FIG. 1, or may be attached to an outer surface of the casing 2, or may be installed so as to be spaced apart from the casing 2.

The power generation system 101A also has an ON-detector, which is not shown in the drawings, for detecting the ON of the combustion device 5 (execution of the combustion operation). The ON-detector is composed of, for example, a signal detector for acquiring an ON signal of the combustion device 5 that is output from the combustion device 5, or a pressure detector for detecting the pressure of the combustion exhaust gas discharged from the combustion device 5.

[Operation]

Next, the control of the controller 22 in the power generation system 101A configured in the above-described manner is discussed below with reference to FIG. 2.

Figure 2:
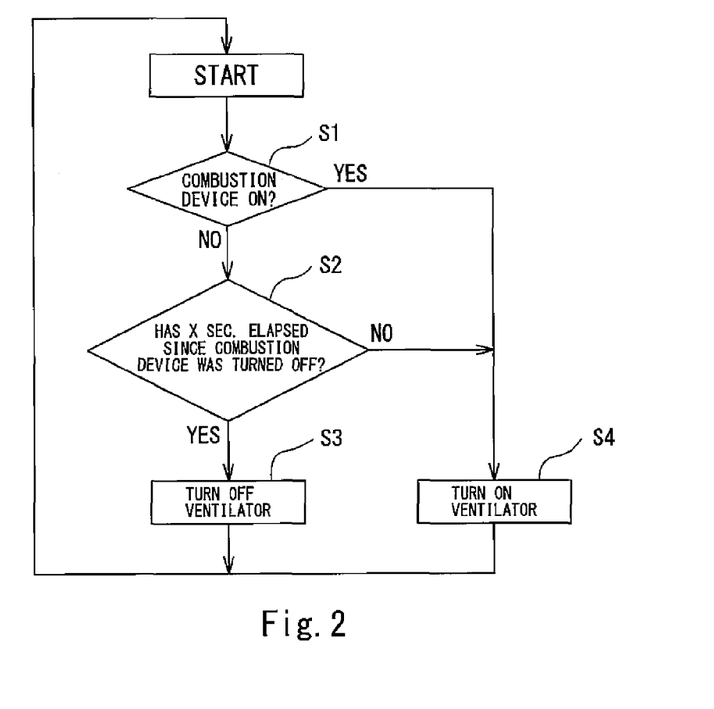
FIG. 2 is a flow-chart illustrating a control by a controller in the power generation system of FIG. 1.

FIG. 2 is a flow-chart illustrating a control by the controller 22 in the power generation system 101A of FIG. 1.

This control is arbitrarily executed independently of the operating state of the power generation system 101A. However, it is also possible to adopt a form in which whether or not the control is executed depending on the operating state. Herein, examples of the just-mentioned operating state include a start-up operation, a power generation operation, a stop operation, and a stand-by state of the power generation system 101A. Here, the stand-by state refers to the state in which a stop operation of the power generation system 101A has finished and the system is waiting for the next start-up. When the power generation system 101A is started up, the power generation unit 1 performs electric power generation.

Meanwhile, as illustrated in FIG. 2, the controller 22 determines whether or not the combustion device 5 is ON based on the detected value by the ON-detector (not shown) (step S1). If the combustion device 5 is ON (if YES at step S1), the controller 22 turns the ventilator 3 ON (step S4). Thereby, the exhaust gas from the ventilator 3 which is discharged out of the casing 2 is passed through the first exhaust gas passage 4 and mixed with the combustion exhaust gas flowing in the second exhaust gas passage 6. It is possible that the combustion exhaust gas may contain a combustible gas because of incomplete combustion in the combustion device 5. However, even when the combustion exhaust gas contains a combustible gas, the combustible gas is diluted by the atmosphere gas because the exhaust gas from the ventilator 3 is the atmosphere gas in the casing.

After turning the ventilator 3 ON, the control by the controller 22 returns to START and repeats the steps subsequent to step S1.

On the other hand, if the combustion device 5 is not ON at step S1 (if NO at step S1), the controller 22 determines whether or not a predetermined time x sec. has elapsed since the combustion device 5 was turned OFF (step S2). The predetermined time×sec. is set to a time necessary for the combustion exhaust gas having been discharged from the combustion device 5 to be discharged from the second exhaust gas passage 6 to outside air, which is determined as appropriate by an experiment, for example.

If the predetermined time×sec. has not elapsed (if NO at step S2), the controller 22 turns the ventilator 3 ON, and thereafter, the control by the controller 22 returns to START.

If the predetermined time×sec. has elapsed (if YES at step S2), the controller 22 turns the ventilator 3 OFF. Thereafter, the control by the controller 22 returns to START.

Although step S2 is provided in the above-described flow, it is also possible that step S2 may be eliminated so that, if the stop of the combustion operation of the combustion device is detected by the ON-detector, the operation of the ventilator 3 may be stopped straight away. Even if a combustible gas is contained in the combustion exhaust gas, the combustion exhaust gas is diluted during the period in which the ventilator 3 is operating. As a result, safety is improved over the case in which the first exhaust gas passage 4 and the second exhaust gas passage 6 are individually connected to the duct. Therefore, the ventilator 3 may not be operated for the entire period in which the combustion exhaust gas is flowing.

Next, modified examples of the present Embodiment 1 are described.

Modified Example 1

The power generation system 101A of the present Modified Example 1 is characterized in that the fuel cell system 101A of the foregoing Embodiment 1 further has the following features. With the following features, the exhaust gas from the ventilator 3 can be suitably mixed with the combustion exhaust gas from the combustion device even when the pressure of the combustion exhaust gas discharged from the combustion device fluctuates. As a result, even when a combustible gas is contained in the combustion exhaust gas flowing in the second exhaust gas passage, the combustible gas can be diluted.

A first configuration example is that the ventilator 3 operates so that the discharge pressure thereof becomes higher than the pressure of the gas at a merging point 21. In other words, the ventilator 3 is designed, as its specification, so as to operate so that the discharge pressure thereof becomes higher than the pressure of the gas at a merging point 21. Therefore, the controller 21 does not need to control the operation of the ventilator 3 so that the discharge pressure of the ventilator 3 becomes higher than the pressure of the gas at the merging point 21.

A second configuration example is that the power generation system 101A is configured so that a controller 30 controls the operation of the ventilator 3 in such a manner that the discharge pressure of the ventilator 3 becomes higher than the pressure of the exhaust gas at the merging point 21 of the first exhaust gas passage 4 and the second exhaust gas passage 6.

In the second configuration example, the power generation system 101A is provided with, for example, a backflow detector (not shown) that detects a backflow of the exhaust gas in the first exhaust gas passage 4 upstream from the merging point 21, or a flow rate detector (not shown) that directly or indirectly detects the flow rate of the gas flowing in the first exhaust gas passage 4 that is upstream of the merging point 21.

In addition, the relationship between the backflow detector or the flow rate detector at the merging point 21 and the operation amount of the ventilator 3 is obtained in advance and stored in the controller 22. The controller 22 outputs a predetermined operation amount to the ventilator 3 based on the detection output from the backflow detector or the flow rate detector and the relationship between the discharge pressure of the ventilator 3 and the operation amount of the ventilator 3, so that the controller 22 controls the operation of the ventilator 3 so that the discharge pressure of the ventilator 3 becomes higher than the pressure of the gas at the merging point 21.

Examples of the backflow detector include a pressure sensor that detects the pressure of the exhaust gas, an $O_2$ sensor that detects the concentration of $O_2$, a $CO_2$ sensor that detects the concentration of $CO_2$, a temperature sensor that detects the temperature of the exhaust gas, and a humidity sensor that detects the humidity of the exhaust gas.

The following describes backflow detection methods using the backflow detectors listed above.

When the exhaust gas from the second exhaust gas passage 6 flows back into the first exhaust gas passage 4, the pressure in the first exhaust gas passage 4 increases. So, the power generation system 101A may have a pressure sensor that detects the pressure in the first exhaust gas passage 5, and the controller 22 may be configured to detect a backflow of the exhaust gas from an increase of the pressure detected by the pressure sensor.

When the exhaust gas from the second exhaust gas passage 6 flows back into the first exhaust gas passage 4, the concentration of $O_2$ in the first exhaust gas passage 4 decreases. So, the power generation system 101A may have an $O_2$ sensor that detects the concentration of $O_2$ in the first exhaust gas passage 4, and the controller 22 may be configured to detect a backflow of the exhaust gas from a decrease of the concentration of $O_2$ detected by the $O_2$ sensor.

When the exhaust gas from the second exhaust gas passage 6 flows back into the first exhaust gas passage 4, the concentration of $CO_2$ in the first exhaust gas passage 4 increases. So, the power generation system 101A may have a $CO_2$ sensor that detects the concentration of $CO_2$ in the first exhaust gas passage 4, and the controller 22 may be configured to detect a backflow of the exhaust gas from an increase of the concentration of $CO_2$ detected by the $CO_2$ sensor.

When the exhaust gas from the second exhaust gas passage 6 flows back into the first exhaust gas passage 4, the temperature in the first exhaust gas passage 4 increases. So, the power generation system may have a temperature sensor that detects the temperature in the first exhaust gas passage 4, and the controller 22 may be configured to detect a backflow of the exhaust gas from an increase of the temperature detected by the temperature sensor.

When the exhaust gas from the second exhaust gas passage 6 flows back into the first exhaust gas passage 4, the humidity in the first exhaust gas passage 4 increases. So, the power generation system may have a humidity sensor that detects the humidity in the first exhaust gas passage 4, and the controller 22 may be configured to detect a backflow of the exhaust gas from an increase of the humidity detected by the humidity sensor.

Examples of the flow rate detector include a flow rate sensor that detects the flow rate in the first exhaust gas passage 4, a current sensor that detects the operating current of the ventilator 3, and a revolution sensor that detects the number of revolutions of the ventilator 3.

The following describes methods of detecting a decrease of the flow rate in the first exhaust gas passage 4 using the flow rate detectors listed above.

When a pressure difference (P1−P2) between the discharge pressure (P1) of the ventilator 3 and the pressure (P2) at the merging point 21 decreases, the flow rate of the exhaust gas in the first exhaust gas passage 4 decreases. So, the power generation system 101A may have a flow rate sensor in the first exhaust gas passage 4, and the controller 22 may be configured to detect a decrease of the flow rate of the gas flowing in the first exhaust gas passage 4 from a decrease of the flow rate detected by the flow rate sensor.

When the just-mentioned pressure difference decreases, the flow rate of the exhaust gas in the first exhaust gas passage 4 decreases. At this time, the operating current of the ventilator 3 decreases. So, the power generation system may have a current sensor that detects the operating current of the ventilator 3, and the controller 22 may be configured to detect a decrease of the flow rate of the exhaust gas in the first exhaust gas passage 4 from a decrease of the operating current of the ventilator 3 detected by the current sensor.

When the just-mentioned pressure difference decreases, the flow rate of the exhaust gas in the first exhaust gas passage 4 decreases. At this time, the number of revolutions of the ventilator 3 increases. So, the power generation system may have a revolution sensor that detects the number of revolutions of the ventilator 3, and the controller 22 may be configured to detect a decrease of the flow rate of the exhaust gas in the first exhaust gas passage 4 from an increase of the number of revolutions of the ventilator 3 detected by the revolution sensor.

It should be noted that the backflow detector and the flow rate detector are merely examples of an embodiment in which the controller 22 directly or indirectly identifies the above-mentioned pressure difference, which may be achieved by any other embodiment. Other than the examples described above, it is also possible to employ an embodiment in which, for example, the controller 22 indirectly identifies a decrease of the above-mentioned pressure difference from the operation amount that is output from the controller 22 to a gas supply device (not shown), which supplies a gas used for combustion to the combustion device 5. Specifically, a decrease of the above-mentioned pressure difference can be indirectly identified by an increase of the operation amount from the controller 22 to a combustion air supply device, which is not shown in the drawings.

Modified Example 2

In the present Modified Example 2, any one of the power generation systems of Embodiment 1 and Modified Example 1 has a controller configured to stop the combustion operation of the combustion device when the discharge pressure of the ventilator becomes lower than the pressure of the gas at the merging point.

Such a configuration makes it possible to suppress the backflow of the combustion exhaust gas from the second exhaust gas passage to the first exhaust gas passage in comparison with the power generation system in which the combustion operation of the combustion device is not stopped even when the discharge pressure of the ventilator is lower than the pressure of the gas at the merging point.

Figure 4:
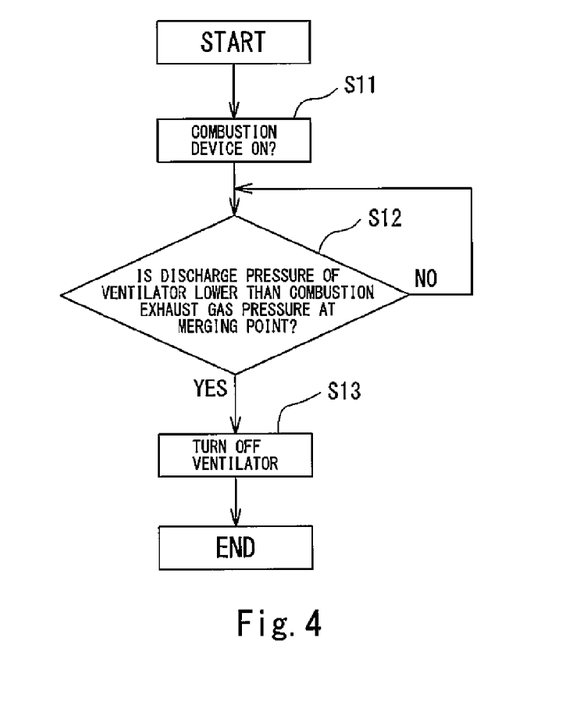
FIG. 4 is a flow-chart illustrating a control by a controller in a power generation system according to Modified Example 2 of Embodiment 1.

More specifically, the hardware of the power generation system 101A of the present Modified Example 2 is configured, for example, like the power generation system 101A of Modified Example 1. It is controlled by the controller 22 in the following manner.

FIG. 4 is a flow-chart illustrating a control by the controller 22 in the present Modified Example 2.

The controller 22 allows the combustion device 5 to operate (step S11). Then, the controller 22 determines whether or not the discharge pressure of the ventilator 3 is lower than the pressure of the gas at the merging point 21 (step S12).

If the discharge pressure of the ventilator 3 is not lower than the pressure of the gas at the merging point 21 (if NO at step S12), the controller 22 repeats step S12 to monitor whether or not the discharge pressure of the ventilator 3 is lower than the pressure of the gas at the merging point 21.

If the discharge pressure of the ventilator 3 is lower than the pressure of the gas at the merging point 21 (if YES at step S12), the controller 22 stops the operation of the combustion device 5 and terminates this control.

The high/low relationship between the discharge pressure of the ventilator 3 and the pressure of the gas at the merging point 21, which is monitored at step S12, is detected by a sensor that detects a pressure difference (P1–P2) between the discharge pressure (P1) of the ventilator 3 and the pressure (P2) of the gas at the merging point 21. For this sensor, it is possible to use, for example, the backflow detector or the flow rate detector of Modified Example 1, which indirectly detects the pressure difference.

For example, in the case of using the backflow detector, if a backflow of the gas is detected based on the detection output of the backflow detector, step S13 is executed, and if a backflow is not detected, step S12 is executed again.

In the case of using the flow rate detector, the detected value is compared with a predetermined threshold value, and if it is determined that the discharge pressure of the ventilator 3 is lower than the pressure of the gas at the merging point 21, step S13 is executed. On the other hand, the detected value is compared with a predetermined threshold value, and if it is determined that the discharge pressure of the ventilator 3 is higher than the pressure of the gas at the merging point 21, step S12 is executed again. Note that the predetermined threshold value is a reference value for determining that the discharge pressure of the ventilator 3 is lower than the pressure of the gas at the merging point 21.

Embodiment 2

A fuel cell system according to Embodiment 2 comprises: a power generation unit; a casing accommodating the power generation unit; a ventilator configured to ventilate the interior of the casing; a first exhaust gas passage configured to pass an exhaust gas from the ventilator which is discharged out of the casing; a combustion device provided external to the casing and configured to generate heat to be supplied to a heat load; and a second exhaust gas passage configured to pass a combustion exhaust gas from the combustion device, wherein the second exhaust gas passage is connected to a duct open to outside air, and the first exhaust gas passage merges with the second exhaust gas passage before the second exhaust gas passage is connected to the duct.

With such a configuration, the combustion exhaust gas from the combustion device is mixed with the atmosphere gas inside the casing from the ventilator. This makes it possible to dilute a combustible gas contained in the combustion exhaust gas even if the combustible gas is contained in the combustion exhaust gas inside the second exhaust gas passage. This offers higher safety at the time when leakage occurs in the second exhaust gas passage than the case in which the first exhaust gas passage and the second exhaust gas passage are connected individually to the duct.

The system further comprises a controller configured to operate the ventilator when the combustion device is performing a combustion operation.

Such a configuration makes it possible to dilute the combustible gas contained in the combustion exhaust gas even if the combustible gas is contained in the combustion exhaust gas during the time in which the combustion exhaust gas is being discharged from the combustion device.

Here, the operation of the ventilator may be either a continuous operation or an intermittent operation. The reason is that both the continuous operation and the intermittent operation are capable of diluting the combustible gas in the combustion exhaust gas if the combustible gas is contained in the combustion exhaust gas. In other words, both the continuous operation and the intermittent operation are capable of offering higher safety than in the case in which the first exhaust gas passage and the second exhaust gas passage are connected individually to the duct.

It should be noted that although the power generation system described hereinbelow employs an embodiment in which the ventilator is allowed to operate when the combustion device is performing a combustion operation, the invention is not limited thereto. The reason is that even when the ventilator is operated arbitrarily irrespective of the combustion operation of the combustion device, it is highly likely that there will be a time period in which the ventilator is operated during the combustion operation of the combustion device.

Figure 3:
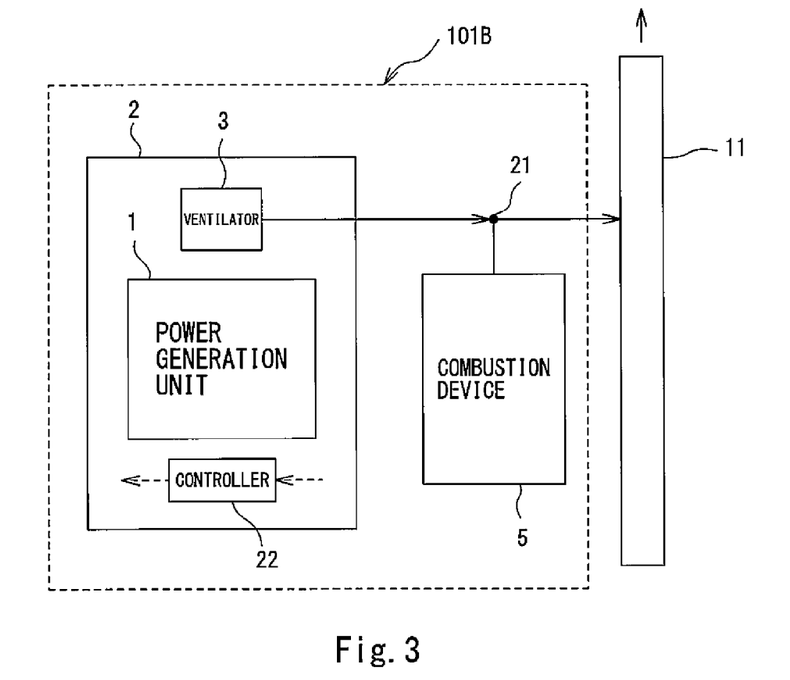
FIG. 3 is a block diagram schematically illustrating the configuration of a power generation system according to Embodiment 2.

FIG. 3 is a block diagram schematically illustrating the configuration of a power generation system according to Embodiment 2.

As illustrated in FIG. 3, a power generation system 101B of the present embodiment is different from the power generation system 101A of Embodiment 101A in the respect that it comprises the combustion device 5 and the second exhaust gas passage 6.

In other respects, the power generation system 101B of the present Embodiment 2 is the same as the power generation system 101A of Embodiment 1, so the description thereof will not be repeated.

In addition, the control of the ventilator 3 by the controller 22 in the power generation system 101B is the same as that in the power generation system 101A of Embodiment 1, so the description thereof will not be repeated.

Modified Example 3

A power generation system of the present Modified Example 3 is configured so that the discharge pressure of the ventilator becomes higher than the pressure of the exhaust gas at the merging point of the first gas passage and the second gas passage, as in the power generation system of the previously-described Modified Example 1.

With such a configuration, the exhaust gas from the ventilator can be mixed with the combustion exhaust gas from the combustion device even when the pressure of the combustion exhaust gas discharged from the combustion device fluctuates. As a result, even when a combustible gas is contained in the combustion exhaust gas flowing in the second exhaust gas passage, the combustible gas can be diluted.

The configuration examples in which the discharge pressure of the ventilator 3 becomes higher than the pressure of the gas at the merging point 21 are the same as those in Modified Example 1, and therefore, the description thereof will not be repeated.

Modified Example 4

The power generation system of the present Modified Example 4 is such that the power generation systems of Embodiment 2 and Modified Example 2 are provided with a controller configured to stop the combustion operation of the combustion device when the discharge pressure of the ventilator becomes lower than the pressure of the gas at the merging point 21, as in Modified Example 2 above.

Such a configuration makes it possible to suppress the backflow of the combustion exhaust gas from the second exhaust gas passage 6 to the first exhaust gas passage 4 in comparison with the power generation system in which the combustion operation of the combustion device is not stopped even when the discharge pressure of the ventilator is lower than the pressure of the gas at the merging point.

The configurations and operations of the present Modified Example 4 are the same as those in Modified Example 2, and therefore, the description thereof will not be repeated.

From the foregoing description, numerous improvements and other embodiments will be readily apparent to those skilled in the art. Accordingly, the foregoing description is to be construed only as illustrative examples.

INDUSTRIAL APPLICABILITY

The power generation system and the method of operating the same according to the present invention are useful in that they can reduce the amount of water condensed from the combustion exhaust gas and thus inhibit the second exhaust gas passage from corrosion, in comparison with the case in which the first exhaust gas passage and the second exhaust gas passage are connected individually to a duct.

REFERENCE SIGNS LIST

1—Power generation unit
2—Casing
3—Ventilator
4—First exhaust gas passage
5—Combustion device
6—Second exhaust gas passage
11—Duct
21—Merging point
22—Controller
101A—Power generation system
101B—Power generation system
101C—Power generation system

The invention claimed is:

1. A power generation system comprising: a power generation unit comprising a fuel cell; a casing accommodating said power generation unit; a ventilator configured to ventilate the interior of said casing; and a first exhaust gas passage configured to pass an exhaust gas from said ventilator which is discharged out of said casing without flowing through said power generation unit, wherein said first exhaust gas passage merges with a second exhaust gas passage connected to a duct open to outside air before the second exhaust gas passage is connected to the duct, the second exhaust gas passage being configured to pass a combustion exhaust gas from a combustion device provided external to said casing and configured to generate heat to be supplied to a heat load.

2. The power generation system according to claim 1, further comprising a controller configured to allow said ventilator to operate when the combustion device is performing a combustion operation.

3. The power generation system according to claim 2, wherein said controller controls an operation of said ventilator so that the discharge pressure of said ventilator becomes higher than the pressure of the gas at the merging point.

4. The power generation system according to claim 1, wherein said ventilator operates so that the discharge pressure thereof becomes higher than the pressure of a gas at the merging point.

5. The power generation system according to claim 1, further comprising a controller configured to stop a combustion operation of said combustion device if the discharge pressure of said ventilator becomes lower than the pressure of a gas at the merging point.

6. The power generation system according to claim 1, further comprising said combustion device and said second exhaust gas passage.

7. The power generation system according to claim 6, further comprising a controller configured to operate said ventilator when said combustion device is performing a combustion operation.

8. The power generation system according to claim 7, wherein said controller controls an operation of said ventilator so that the discharge pressure of said ventilator becomes higher than the pressure of an exhaust gas at the merging point.

9. The power generation system according to claim 6, wherein said ventilator operates so that the discharge pressure thereof becomes higher than the pressure of a gas at the merging point.

10. The power generation system according to claim 6, further comprising a controller configured to stop a combustion operation of said combustion device if the discharge pressure of said ventilator becomes lower than the pressure of a gas at the merging point.

11. A method of operating a power generation system comprising: a power generation unit comprising a fuel cell; a casing accommodating said power generation unit; a ventilator configured to ventilate the interior of said casing; and a first exhaust gas passage configured to pass an exhaust gas from said ventilator which is discharged out of said casing without flowing through said power generation unit, wherein said first exhaust gas passage merges with a second exhaust gas passage connected to a duct open to outside air before said second exhaust gas passage is connected to said duct, said second exhaust gas passage being configured to pass a combustion exhaust gas from a combustion device provided external to said casing and configured to generate heat to be supplied to a heat load, the method comprising:
    operating said ventilator when said combustion device is performing a combustion operation.

12. The method of operating a power generation system according to claim 11, wherein said ventilator operates so that the discharge pressure thereof becomes higher than the pressure of a gas at the merging point.

13. The method of operating a power generation system according to claim 11, wherein the combustion operation of said combustion device is stopped if the discharge pressure of said ventilator becomes lower than the pressure of a gas at the merging point.

14. The method of operating a power generation system according to claim 11, wherein the power generation system further comprises said combustion device and said second exhaust gas passage.

15. The method of operating a power generation system according to claim 14, wherein said ventilator operates so that the discharge pressure thereof becomes higher than the pressure of a gas at the merging point.

16. The method of operating a power generation system according to claim 14, wherein the combustion operation of said combustion device is stopped if the discharge pressure of said ventilator becomes lower than the pressure of a gas at the merging point.

17. The power generation system according to claim 1, wherein the exhaust gas from said ventilator, which is passed through said first exhaust gas passage, is air from the interior of said casing, the air having been ventilated by said ventilator.

18. The method of operating a power generation system according to claim 11, wherein the exhaust gas from said ventilator, which is passed through said first exhaust gas passage, is air from the interior of said casing, the air having been ventilated by said ventilator.

* * * * *